US009579935B2

(12) United States Patent
Infantini

(10) Patent No.: US 9,579,935 B2
(45) Date of Patent: Feb. 28, 2017

(54) TIRE PRESSURE CONTROL SYSTEM FOR A VEHICLE

(71) Applicant: CNH Industrial America LLC, New Holland, PA (US)

(72) Inventor: Mauricio Blanco Infantini, Bairro Parque Compolim (BR)

(73) Assignee: CNH Industrial America LLC, New Holland, PA (US)

( * ) Notice: Subject to any disclaimer, the term of this patent is extended or adjusted under 35 U.S.C. 154(b) by 138 days.

(21) Appl. No.: 14/470,306

(22) Filed: Aug. 27, 2014

(65) Prior Publication Data

US 2016/0059643 A1    Mar. 3, 2016

(51) Int. Cl.
*B60C 23/02* (2006.01)
*B60C 23/00* (2006.01)

(52) U.S. Cl.
CPC ............ *B60C 23/002* (2013.01); *B60C 23/00* (2013.01)

(58) Field of Classification Search
None
See application file for complete search history.

(56) References Cited

U.S. PATENT DOCUMENTS

| 5,293,919 | A | 3/1994 | Olney et al. |
| 5,587,698 | A | 12/1996 | Genna |
| 5,790,016 | A | 8/1998 | Konchin et al. |
| 6,144,295 | A * | 11/2000 | Adams .................. B60C 23/003 137/224 |
| 6,539,295 | B1 | 3/2003 | Katzen et al. |
| 7,117,731 | B2 | 10/2006 | Hrabal |
| 7,119,670 | B2 | 10/2006 | Hammerschmidt |
| 7,321,840 | B2 | 1/2008 | Abramovitch |

(Continued)

FOREIGN PATENT DOCUMENTS

| DE | 102004002807 | 8/2005 |
| EP | 2078624 | 7/2009 |

(Continued)

OTHER PUBLICATIONS

Infantini et al., "Model of an ABS Pneumatic Regenerative Braking System," Society of Automotive Engineers, Inc., 2005.

(Continued)

*Primary Examiner* — Andre Allen
(74) *Attorney, Agent, or Firm* — Rebecca L. Henkel; Rickard K. DeMille

(57) ABSTRACT

The present disclosure describes a tire management system for a vehicle. The tire management system includes a first load sensor that determines a first load placed on a first tire of the vehicle, a first pressure sensor that determines a first fluid pressure within the first tire, a control unit communicatively coupled to the first load sensor and to the first pressure sensor. The control unit generates a first fluid pressure adjustment instruction based at least in part on the first load determined by the first load sensor and the first fluid pressure determined by the first pressure sensor. Additionally, the tire management system includes a first valve fluidly coupled to the first tire and communicatively coupled to the control unit, in which the first valve adjusts the first fluid pressure within the first tire based at least in part on the first fluid pressure adjustment instruction.

20 Claims, 5 Drawing Sheets

(56) References Cited

U.S. PATENT DOCUMENTS

| | | | |
|---|---|---|---|
| 8,584,517 B2 | 11/2013 | Strahan | |
| 8,640,534 B2 | 2/2014 | Sheikh-Bahaie | |
| 8,661,885 B1 | 3/2014 | Singh et al. | |
| 2007/0068238 A1* | 3/2007 | Wendte | B60C 23/002 73/146 |
| 2009/0055040 A1 | 2/2009 | Nagaya | |
| 2009/0084173 A1* | 4/2009 | Gudat | B60P 1/283 73/146 |
| 2010/0256946 A1 | 10/2010 | Carresjö et al. | |
| 2012/0101746 A1 | 4/2012 | Taylor et al. | |
| 2012/0116694 A1 | 5/2012 | Norair | |
| 2012/0137789 A1* | 6/2012 | Arimura | B62D 6/10 73/862.335 |
| 2013/0046439 A1 | 2/2013 | Anderson et al. | |
| 2013/0074591 A1 | 3/2013 | Hyun et al. | |
| 2014/0298923 A1* | 10/2014 | Geldman | G01L 1/2287 73/862.627 |
| 2015/0174972 A1* | 6/2015 | Zhou | B60C 23/003 340/447 |
| 2015/0202931 A1* | 7/2015 | Honig | B60C 23/001 152/416 |

FOREIGN PATENT DOCUMENTS

| | | | |
|---|---|---|---|
| WO | 0034060 A1 | 6/2000 | |
| WO | 2012068583 A1 | 5/2012 | |

OTHER PUBLICATIONS

Van et al., "Effects of Tire Inflation Pressure on Soil Contact Pressure and Rolling Resistance of Farm Tractors," Bull. Fac. Agr., 2008, Saga Univ., pp. 101-108, No. 93.

K Vet al., "An Intelligent Online Vehicle Tyre Pressure Monitoring System," Jun. 2012, pp. 301-308, vol. 2, No. 3, International Journal of Electrical and Computer Engineering (IJECE).

Zyl et al., "Study on Tyre Pressure Monitoring Systems (TPMS) as a Means to Reduce Light-Commercial and Heavy-Duty Vehicles Fuel Consumption and CO2 Emissions," European Commission DG Clima, Jul. 29, 2013, pp. 1-157, TNO 2013 R10986.

Wang et al., "Developing Research on Vehicle Tire Pressure Detection and Adjustment System," Jan. 3, 2014, pp. 42-49, vol. 6, No. 3, The International Journal of Organizational Innovation.

"Ploughing Ahead," Powertrain, 2014, pp. 34-35, iVTInternational. com Off-Highway.

Wang et al., "Introduction of the Tire Pressure Detection/Adjustment System," Introduction of the Tire Pressure Detection/Adjustment System, 2014. pp. 42-54.

Extended European Search Report for EP Application No. 15182196.4 mailed Dec. 21, 2015; 7 pages.

* cited by examiner

TIRE PRESSURE CONTROL SYSTEM FOR A VEHICLE

BACKGROUND

The present disclosure generally relates to managing tire pressure for vehicles, and more particularly, to determining and adjusting tire pressure in the vehicles.

Generally, vehicles, such as an off-road work vehicle provides versatility by being able to perform a multitude of tasks. To help illustrate, an off-road tractor may pull a planter implement to plant seeds in a field. Additionally, a loader attachment may be attached to the off-road tractor to lift bales of hay. However, the various tasks a single off-road work vehicle performs may place different load profiles (e.g., forces or weights) on the vehicle. Continuing with the two examples above, using the off-road tractor to pull an implement may place a higher load on the rear wheels and a lower load on the front wheels of the tractor. On the other hand, attaching a loader to the front of the off-road tractor may place a higher load on the front wheels and a lower load on the rear wheels of the tractor.

The varying loads placed on the vehicle may affect the performance of the vehicle's tires. For example, when tire pressure is lower than desired for a particular tire load, the tire may deform along the sidewalls of the tire (e.g., radially contracting a central portion of the tire), which may decrease fuel efficiency of the off-road vehicle. On the other hand, when tire pressure is higher than desired for a particular tire load, the tire may deform along the tread of the tire (e.g., radially expanding a central portion of the tire), which may decrease traction of the vehicle.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment describes a tire management system for an off-road work vehicle. The tire management system includes a first load sensor that determines a first load placed on a first tire of the off-road work vehicle, a first pressure sensor that determines a first fluid pressure within the first tire, a control unit communicatively coupled to the first load sensor and to the first pressure sensor. The control unit generates a first fluid pressure adjustment instruction based at least in part on the first load determined by the first load sensor and the first fluid pressure determined by the first pressure sensor. Additionally, the tire management system includes a first valve fluidly coupled to the first tire and communicatively coupled to the control unit, in which the first valve adjusts the first fluid pressure within the first tire based at least in part on the first fluid pressure adjustment instruction.

A second embodiment describes a tangible, non-transitory, computer-readable medium storing instructions executable by a processor of a tire management system in an off-road work vehicle. The instructions include instructions to receive a load profile on a tire of the off-road work vehicle from a load sensor communicatively coupled to the processor, determine, using the processor, a desired fluid pressure within the tire based on the load profile, and instruct, using the processor, a valve fluidly coupled to the tire to adjust the fluid pressure within the tire to the desired fluid pressure during operation of the off-road work vehicle by selectively providing air to the tire or releasing air from the tire.

A third embodiment describes a tire management system for a including a valve fluidly coupled to a tire of the vehicle. The valve adjusts fluid pressure within the tire to a first desired fluid pressure during operation of the vehicle based at least in part on a first load placed on the tire and adjusts tire pressure of the tire to a second desired fluid tire pressure during operation of the vehicle based at least in part on a second load placed on the tire, in which the first desired tire pressure and the second desired tire pressure are different. The tire management system also includes a control unit communicatively coupled to the valve that controls operation of the valve.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
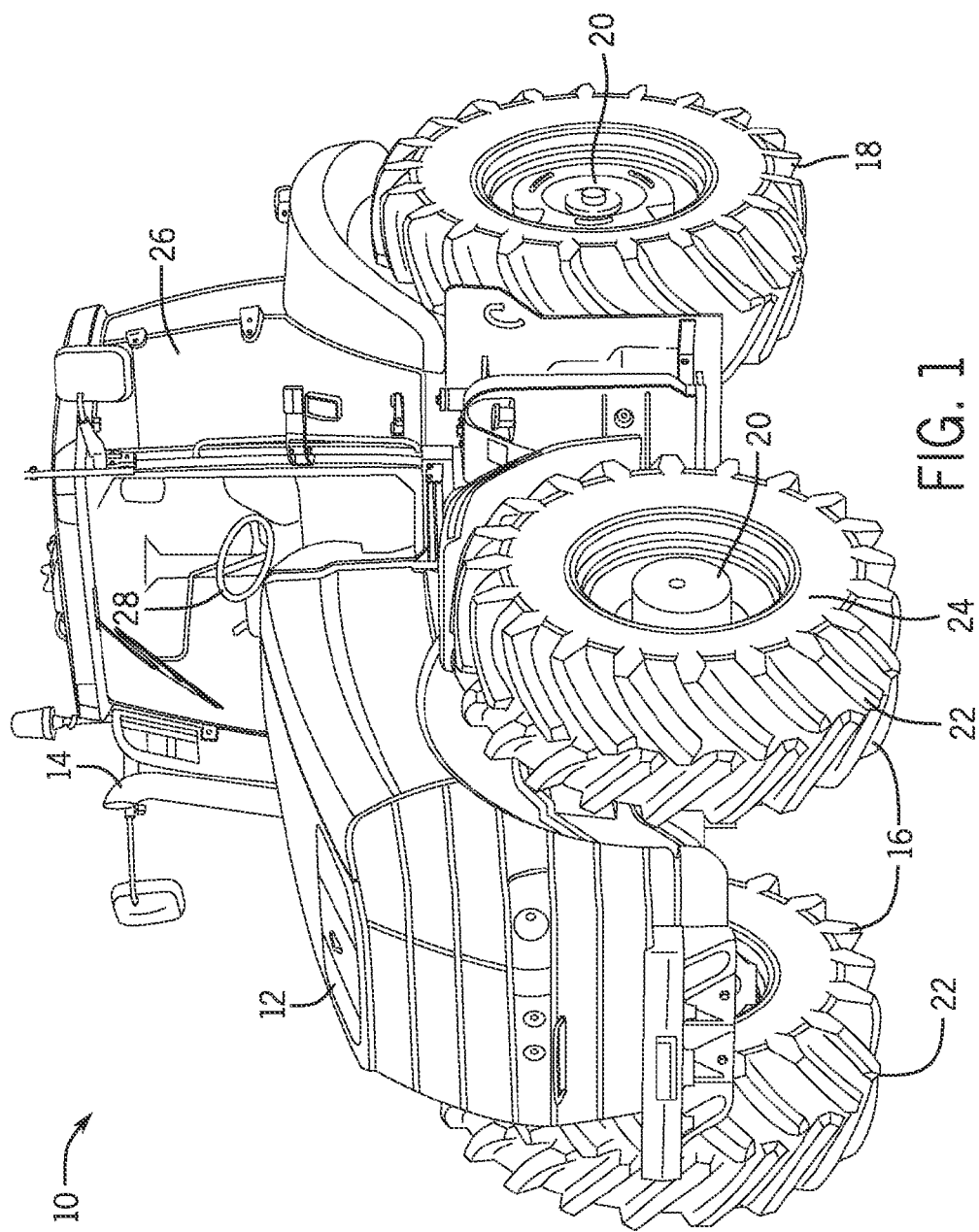
FIG. 1 is a perspective view of an off-road work vehicle, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed above, vehicles are generally designed to perform a multitude of tasks. To simplify the following discussion, the techniques described herein are specifically described in relation to off-road work vehicles because they generally perform larger variations of tasks. However, the techniques described herein may be more generally applied to any type of vehicle, such as a truck, passenger vehicle, or the like.

As used herein, an "off-road work vehicle" may be an off-road tractor, an off-road truck, or the like. Accordingly, the tasks that an off-road work vehicle may perform include pulling objects (e.g., an agricultural implement or a trailer), pushing objects (e.g., plow), lifting objects with an attachment (e.g., bales of hay), carrying objects, and the like.

More specifically, depending on the task the off-road work vehicle is performing, a different load profile may be placed on the off-road work vehicle. As used herein, a "load profile" is intended to describe the magnitude and/or distribution of load placed on the off-road work vehicle. For example, an off-road tractor pulling a sixteen row planting implement may have a load profile that places one thousand newtons on each of the rear tires and five hundred newtons on each of the front tires because the weight of the planting implement is primarily distributed to the rear tires. On the other hand, an off-road tractor with a loader attachment may have a load profile that places eight hundred newtons on each of the front tires and six hundred newtons on each of the rear tires because the weight of the loader attachment is primarily distributed to the front tires. Additionally, when the loader attachment is used to lift an object (e.g., a bale of hay), the load profile may change again.

However, as the load profile changes, the operational characteristics of the off-road work vehicle may be affected. More specifically, in some embodiments, the operational characteristics may be affected by performance of the tires on the off-road work vehicle as a result of the changing load profile. For example, assuming constant tire pressure, as load increases, a tire may begin to deform along its sidewalls (e.g., flattening, radially contracting a central portion of the tire, etc.) and increase its contact area with the ground, which may reduce fuel efficiency of the off-road vehicle because the tire is less circular and rolling resistance increases. Additionally, the larger contact area with the ground compacts a larger swath of soil, which may be undesirable in a seed planting operation. On the other hand, as load decreases, a tire may begin to deform along its tread (e.g., bulging, radially expanding a central portion of the tire, etc.) and reduce its contact with the ground, which may reduce traction of the tire. Additionally, the reduced contact area may tightly compact soil, which may be undesirable in a seed planting operation.

Accordingly, one embodiment of the present disclosure describes a tire management system that includes a load sensor that determines a load placed on a tire of the off-road work vehicle and a pressure sensor that determines fluid pressure within the tire. Additionally, the tire management system includes a control unit that is communicatively coupled to the load sensor and to the pressure sensor, which generates a tire pressure adjustment instruction based at least in part on the determined load and the determined tire pressure. Furthermore, the tire management system includes a valve that is fluidly coupled to the tire and communicatively coupled to the control unit, which adjusts the tire pressure based at least in part on the tire pressure adjustment instruction. In other words, as will be described in more detail below, the techniques described herein may dynamically adjust tire pressure based on load placed on the tires of the off-road work vehicle. More specifically, the tire pressure may be adjusted such that the tire is maintained at a desired tire pressure and shape, which may improve fuel efficiency of the off-road work vehicle, traction of the tire, footprint of the tire, and the like.

To help illustrate, an embodiment of an off-road work vehicle 10 that may use a tire management system is described in FIG. 1. More specifically, the depicted off-road work vehicle 10 is an agricultural off-road tractor, such as a Puma® Series Tractor, made available by CNH Industrial N.C. of Essex, United Kingdom. However, in alternate embodiments, the techniques described herein may be utilized in any suitable off-road work vehicle that performs a multitude of tasks, which may place varying load profiles on the off-road work vehicle, such as an off-road truck.

As depicted, the off-road work vehicle 10 includes a body 12, which may house an engine, transmission, cooling system, and power train (not separately shown). In some embodiments, the body 12 may also house a portion of the tire management system. Additionally, as depicted, the off-road work vehicle 10 includes an exhaust pipe 14, which may carry exhaust gas away from the vehicle 10.

Furthermore, as depicted, the off-road work vehicle 10 includes two front tires 16 and two rear tires 18 connected to the vehicle 10 by respective axles 20. As depicted, each tire 16 and 18 includes a tread portion 22 and a sidewall portion 24. More specifically, the tires 16 and 18 may rotate about the axle 20 such that the tread 22 engages the ground to move the off-road vehicle 10. In some embodiments, the axles 20 may be coupled to respective suspension systems (e.g., springs and/or shock absorbers) to reduce the effect of bumps and/or vibrations experienced by the wheels 16 and 18.

The off-road work vehicle 10 also includes a cabin 26 where an operator may sit or stand to control and/or monitor operation of the off-road work vehicle 10. For example, an operator may control direction of the off-road work vehicle 10 using the steering wheel 28. In addition, in some embodiments, the operator may view operating conditions of the off-road work vehicle 10 using a display panel and/or indicator lights. Additionally, the operator may adjust the operating conditions using various controls (e.g., buttons and/or levers). For example, as will be described in more detail below, a display panel may inform an operator whether to increase or decrease tire pressure. In response to an indication of low tire pressure, the operator may adjust a control to instruct a valve to flow air into the tire 16 or 18 from a compressed air source, thereby increasing tire pressure. On the other hand in response to an indication of high tire pressure, the operator may adjust a control to instruct the valve to release air from the tire 16 or 18, thereby reducing tire pressure.

Figure 2:
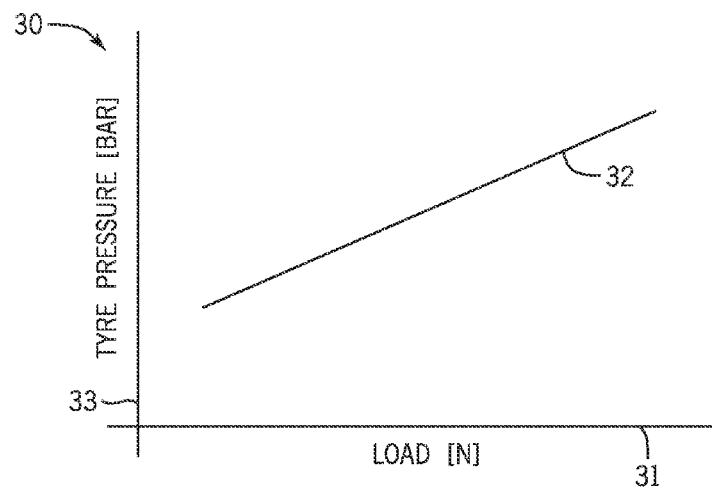
FIG. 2 is a graph of desired tire pressure as a function of load placed on the tire, in accordance with an embodiment.

As described above, performance of each tire 16 or 18 may be directly related to the tire pressure and the load placed on the tire 16 or 18. To help illustrate, a graph of tire pressure as a function of load placed on the tire is shown in FIG. 2. As depicted, the graph 30 includes an X-axis 31 that represents load in newtons and a Y-axis 33 that represents tire pressure in bar. As illustrated, a linear desired pressure line 32 is plotted on the graph 30, which represents a desired (e.g., target) tire pressure for a tire (e.g., front tire 16 or rear tire 18) as a function of load applied to the tire. As used herein, a "desired tire pressure" is intended to describe a tire pressure that maintains the tire in a desired shape under a particular load, thereby maintaining a desired contact with the ground and desired fuel efficiency. As described above, since the load profile may change for each task performed by the off-road work vehicle, the desired tire pressure of each tire may also change. Additionally, in some embodiments, the desired tire pressure may vary linearly with the load profile. In other embodiments, the desired tire pressure may vary non-linearly with the load profile.

Based on the graph 30, when the tire pressure is above the desired (e.g., target) tire pressure line 32, the tire pressure is greater than desired, thereby deforming the tire along the tread 22. On the other hand, when the tire pressure is below the desired tire pressure line 32, the tire pressure is less than desired, thereby deforming the tire along the sidewalls 24. Accordingly, the closer the tire pressure is to the desired tire pressure line 32, the less the tire is deformed. Thus, as will be described in more detail below, the relationship between tire pressure and tire load (e.g., as shown in graph 30) may be used by a tire management system to control/adjust tire pressure based on the load placed on the tires 16 or 18.

Figures 3A, 3B, 3C:
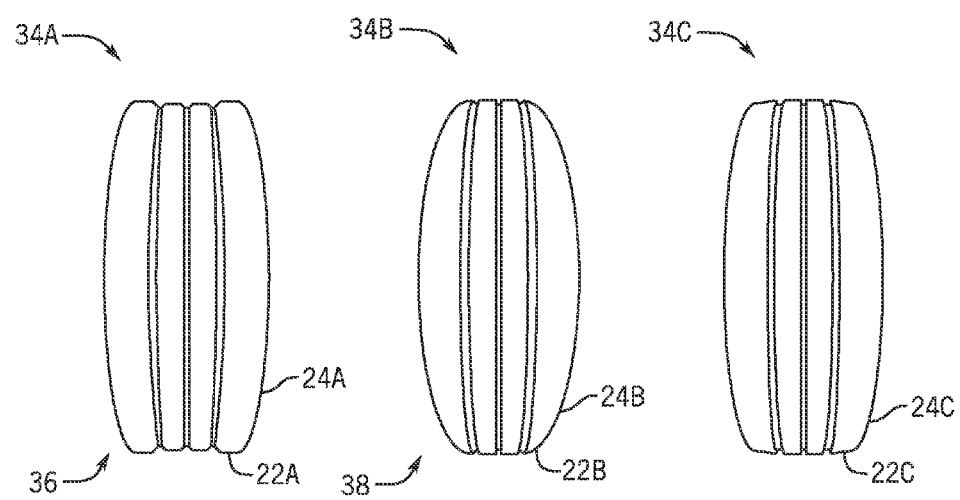
FIG. 3A is a front view of a tire having a tire pressure that is lower than desired, in accordance with an embodiment.
FIG. 3B is a front view of a tire having a tire pressure that is higher than desired, in accordance with an embodiment.
FIG. 3C is a front view of a tire at a desired tire pressure, in accordance with an embodiment.

To help illustrate the effects of tire pressure on the tire 16 or 18, FIGS. 3A-3C show a tire 34 (e.g., front tire 16 or rear tire 18) under differing load and tire pressure conditions. More specifically, FIG. 3A is a front view of the tire 34A at a tire pressure that is lower than desired, FIG. 3B is a front view of the tire 34B at a tire pressure higher than desired, and FIG. 3C is a front view of the tire 34C at a desired tire pressure.

As described above, the tire 34A depicted in FIG. 3A is at a lower tire pressure than desired for a given load. For example, the tire pressure may be below the desired tire pressure line 32. Generally, when the tire pressure is lower than desired, the tire pressure may be insufficient in relation to the load to maintain the desired shape of the tire 34A, which may cause the tire 34A to deform along its sidewalls 24A (e.g., flatten, radially contracting a central portion of the tire, etc.). More specifically, as depicted, the tire sidewalls 24A may bulge outward where the tire 34A contacts the ground (portion 36). As such, in addition to the tread 22A, a portion of the tire sidewalls 36 may contact the ground, thereby increasing the footprint of the tire 34A. In an agricultural setting, an increased tire footprint may be undesirable because loose soil is beneficial for seed planting and the tire may compact the soil over a wider swath.

Additionally, since the tire pressure is insufficient to maintain the desired shape of the tire 34, the tire 34A may become less circular. When the tire 34A becomes less circular, the rotational resistance may increase. As a result, more energy may be used to rotate the tire 34A. As such, fuel efficiency of the off-road work vehicle 10 may decrease when the tire pressure of at least one tire is below the desired pressure for a given tire load.

On the other hand, the tire 34B depicted in FIG. 3B is at a higher tire pressure than desired for a given load. For example, the tire pressure may be above the desired tire pressure line 32. Generally, when the tire pressure is higher than desired, the structure of the tire 34B may be insufficient in relation to the tire pressure to maintain the desired shape of the tire, which may cause the tire 34B to deform along its tread 22B (e.g., bulge, radially expanding a central portion of the tire, etc.). More specifically, as depicted, the tread 22B may bulge outward even where the tire 34B contacts the ground (portion 38). As such, a portion of the tire tread 38 may be lifted off the ground, which may reduce traction because less of the tire tread 22B contacts the ground. In other words, traction provided by the tires 34 may decrease when the tire pressure is greater than desired.

Additionally, since portions of the tread 22B are lifted away from the ground, the load (e.g., weight) of the off-road work vehicle 10 may be distributed over a smaller area. In other words, the load per area under the tire 34B may increase. As described above, in an agricultural setting, loose soil is more conducive to seed planting. However, since the load of the off-road work vehicle 10 may be more concentrated, the magnitude of soil compaction under the tire 34B may increase, which may be undesirable in an agricultural setting.

Comparatively, the tire 34C depicted in FIG. 3C is at a desired tire pressure for a given load. For example, the tire pressure may be substantially close to the desired tire pressure line 32. Generally, under the tire having a desired tire pressure, the tire sidewalls 24C may deform slightly, which enables the tire tread 22C to fully contact the ground. As such, the traction (e.g., friction) provided by the tire 34C may be fully utilized. Additionally, the shape of the tire 34C may remain generally circular. As such, fuel efficiency of the off-road work vehicle 10 may be enhanced because rotational resistance is not increased by an underinflated tire. Accordingly, at the desired tire pressure, the tire 34C strikes a balance between traction provided, fuel efficiency, and footprint of the tire 34.

As such, it is desirable to maintain the tire 34 at a desired tire pressure (e.g., substantially close to the desired tire pressure line 32). As described above, a tire management system may maintain the tires 34 at the desired tire pressure based on the load profile placed on the off-road work vehicle 10, and more specifically based on the load applied to each tire 34. Accordingly, the tire management system includes tire pressure sensors to determine fluid pressure within each tire 34 and load sensors to determine load on each tire 34.

Generally, any suitable technique for determining tire pressure may be used. For example, in some embodiments, a pressure sensor is coupled to the tire valve, which is used to inflate and deflate the tire 34. In other embodiments, a pressure sensor is mounted on the rim of the wheel. In each embodiment, the pressure sensor determines the fluid pressure within the tire and communicates the measurement to a control unit in a tire management system, for example, via a wired connection or a wireless connection.

Figure 4A:
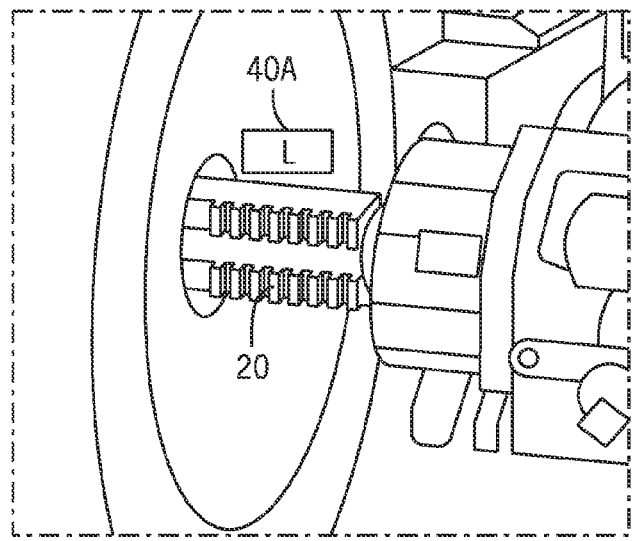
FIG. 4A is a perspective view of a load sensor placed on a trumpet of an off-road work vehicle, in accordance with an embodiment.
Figure 4B:
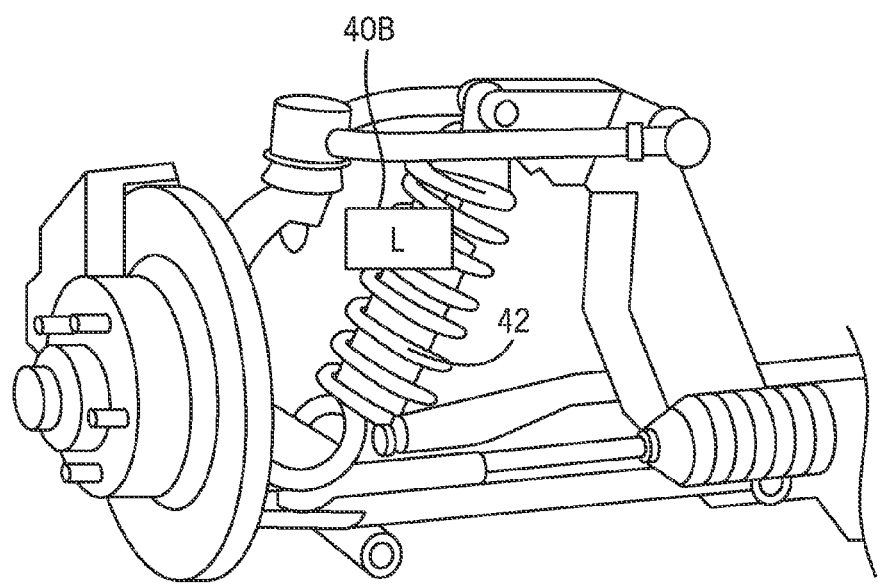
FIG. 4B is a perspective view of a load sensor placed on a suspension component of an off-road work vehicle, in accordance with an embodiment.

Similarly, any suitable technique for determining the load applied to each tire 34 may be used. For example, in some embodiments, a strain sensor (e.g., load sensor) 40A is coupled to the axle 20 as depicted in FIG. 4A. More specifically, the strain sensor 40A determines load based at least in part on the distance the axle 20 is deformed as a result of the load. In other embodiments, a load sensor 40B is coupled to the suspension system 42 (e.g., shocks, struts, suspensions, etc.) of the off-road work vehicle 10 as depicted in FIG. 4B. More specifically, the load sensor 40B determines load based at least in part on the distance the suspension system 42 is compressed as a result of the load. In each embodiment, the load sensor 40 communicates the determined load to a control unit in the tire management system, for example, via a wired connection or a wireless connection.

Figure 5:
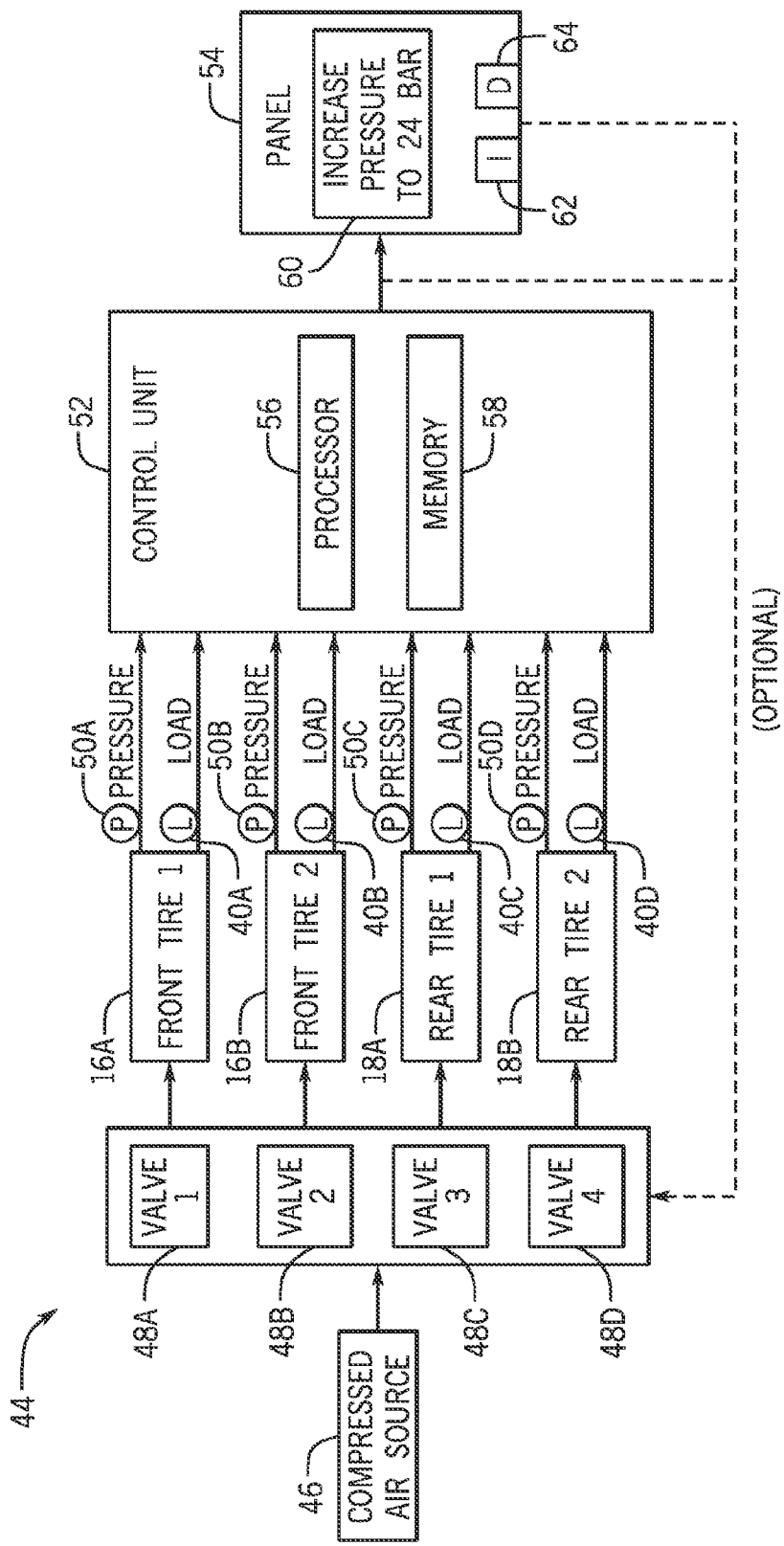
FIG. 5 is a block diagram of a tire pressure management system, in accordance with an embodiment.

The tire management system is configured to control/adjust fluid pressure within the tires 34 based at least in part on the determined tire pressures and the determined loads. To help illustrate, one embodiment of a tire management system 44 is shown in FIG. 5. More specifically, the tire management system 44 is configured to control/adjust tire pressure of a first front tire 16A, a second front tire 16B, a first rear tire 18A, and a second rear tire 18B.

To facilitate controlling tire pressure, the tire management system 44 includes a compressed air source 46, valves 48, tire pressure sensors 50, load sensors 40, a control unit 52, and an operator panel 54. More specifically, the tire pressure of the first front tire 16A may be adjusted via the first valve 48A. For example, the first valve 48A fluidly connects the first front tire 16A to the compressed air source 46, thereby selectively supplying air into the first front tire 16A and increasing the tire pressure. On the other hand, the first valve 48A may release air from the first front tire 16A to reduce the tire pressure. In some embodiments, the compressed air source 46 may be driven by the engine of the off-road work vehicle, for example, a compressor in a sugar cane tractor. Additionally or alternatively, the compressed air source 46 may be a supercharger or a turbo charger configured to route a portion of the airflow to the valves 48. In further embodiments, the compressed air source 46 may be external to the vehicle 10.

As described above, it is desirable to use the valves 48 to adjust tire pressure to a desired tire pressure for a given load. Accordingly, to facilitate adjusting tire pressure of the first front tire 16A, a first pressure sensor 50A determines tire pressure of the first front tire 16A and a first load sensor 40A determines a load placed on the first front tire 16A. As described above, any suitable pressure sensors and/or load sensors may be utilized. For example, in some embodiments, the first pressure sensor 50A may be fluidly coupled to the first valve 48A and the first load sensor 40A may be mechanically coupled to the axle 20 or to the suspension system 42 proximate to the first front tire 16A.

Similarly, the tire pressure of the second front tire 16B may be adjusted via the second valve 48B, the tire pressure of the first rear tire 18A may be adjusted via the third valve 48C, and the tire pressure of the second rear tire 18B may be adjusted via the fourth valve 48D. Additionally, a second pressure sensor 50B and a second load sensor 40B determines tire pressure of and load on the second front tire 16B, a third pressure sensor 50C and a third load sensor 40C determines tire pressure of and load on the first rear tire 18A, and a fourth pressure sensor 50D and a fourth load sensor 40D determines tire pressure of and load on the second rear tire 18B. Accordingly, since the load may be different for each tire based on the task being performed, the tire pressure for each tire 16 or 18 may be individually and independently managed (e.g., controlled and/or adjusted).

More specifically, the tire pressure may be managed by the control unit 52. In some embodiments, the control unit 52 may be included in a vehicle control unit (VCU) or as a standalone module. Accordingly, the control unit 52 may include a processor 56 and a memory 58. As used herein, the processor 56 may include one or more general purpose microprocessors, one or more application specific integrated circuits (ASICs), one or more field programmable gate arrays (FPGAs), or any combination thereof. Additionally, the memory 58 may be a tangible, non-transitory, computer-readable medium that stores instructions executable by the processor 56 to perform operations, and data to be processed by the processor 56. As such, the memory 56 may include volatile memory, such as random access memory (RAM), and/or non-volatile memory, such as read only memory (ROM), flash drives, optical drives, flash drives, and the like.

As described above, the tire pressure may be managed based on the desired tire pressure versus load relationship (e.g., curve 32). As such, a digital representation of the curve 32 may be stored in memory 58 or another storage device.

Additionally or alternatively, a corresponding look-up table or a representative equation may be stored in memory 58. Accordingly, as will be described in more detail below, the processor 56 may access the desired tire pressure versus load relationship from the memory 58 to determine whether it would be desirable to increase or decrease tire pressure of each tire 16 or 18 based on the tire pressure measurement received from the tire pressure sensors 50 and the load measurements received from the load sensors 40.

When the control unit 52 determines that it would be desirable to increase or decrease tire pressure, the control unit 52 outputs a tire pressure adjustment instruction. More specifically, the tire pressure adjustment instruction includes instructions indicative of whether to increase or decrease tire pressure. In some embodiments, the tire pressure adjustment instruction may be transmitted to the operator panel 54. Based on the tire pressure adjustment instruction, the operator panel may inform an operator whether it would be desirable to increase or decrease tire pressure and/or the magnitude of the tire pressure adjustment, for example, via a display 60. For instance, in the depicted embodiment, the display 60 displays a graphical user interface informing the operator that it would be desirable to increase tire pressure to twenty-four bar.

In some embodiments, the operator may manually adjust the tire pressure. For example, an operator may manually release air via each valve 48 to decrease tire pressure or provide air from the compressed air source 46 to increase tire pressure. In fact, in some embodiments, the operator may manually connect each valve 48 to an external compressed air source 46, for example, in response to the prompt displayed on the display 60.

However, manually adjusting tire pressure at each tire may be time consuming, especially with increased number of tires (e.g., six or eight tires). Accordingly, in other embodiments, the operator may manually adjust the tire pressure from the cabin 26, for example, in response to the prompt display on the display 60. For example, in the depicted embodiment, an operator may increase tire pressure by depressing an increase pressure button 62 on the operator panel 54, and/or decrease tire pressure by depressing a decrease pressure button 64 on the operator panel 54. In some embodiments, when the increase pressure button 62 or the decrease pressure button 64 is selected, the operator panel 54 may communicate a corresponding instruction to the valves 48 to increase or decrease tire pressure, which then adjusts the tire pressure of each tire as instructed.

Additionally, in some embodiments, the control unit 52 may automatically adjust tire pressure, for example, by communicating the tire pressure adjustment instruction directly to the corresponding valve 48. The valve 48 may then make the desired tire pressure adjustment based on the tire pressure adjustment instruction. In some embodiments, enabling the control unit 52 to automatically adjust tire pressure may be particularly beneficial because it enables an operator to focus on operating the work vehicle without having to focus on the tire pressure adjustments being applied.

In either case, the tire pressure of each tire may be individually and/or independently managed. For example, the control system 52 may adjust the tire pressure of the first front tire 16A by communicating a tire pressure adjustment instruction to the first valve 48A, the tire pressure of the second front tire 16B by communicating a tire pressure adjustment instruction to the second valve 48B, the tire pressure of the first rear tire 18A by communicating a tire pressure adjustment instruction to the third valve 48C, and the tire pressure of the second rear tire 18B by communicating a tire pressure adjustment instruction to the fourth valve.

In other words, the tire pressure of any of the tires may be adjusted. For example, when a planting implement is connected to the off-road work vehicle 10, the load placed on the rear tires 18 may significantly increase while the load placed on the front tires 16 may remain substantially the same. As such, the control system 52 may instruct the third valve 48C and the fourth valve 48D to increase air pressure within the rear tires 18. On the other hand, when a loader attachment is connected to the off-road work vehicle 10, the load placed on the front tires 16 may significantly increase while the load placed on the rear tires 18 may only slightly increase. As such, the control system 52 may instruct the first valve 48A and the second valve 48B to increase air pressure within the front tires 16, and instruct the third valve 48C and the fourth valve 48D to slightly increase air pressure in the rear tires 18.

In other words, the load profile on the off-road work vehicle 10 may change as the vehicle 10 switches tasks. Additionally, even while performing a task, the load profile may change. For example, when an off-road work vehicle 10 is pulling a seed planting implement, the load profile may change as seeds are planted and weight of the implement decreases. Furthermore, the load profile may again change when the seed planting implement is refilled with seeds.

Figure 6:
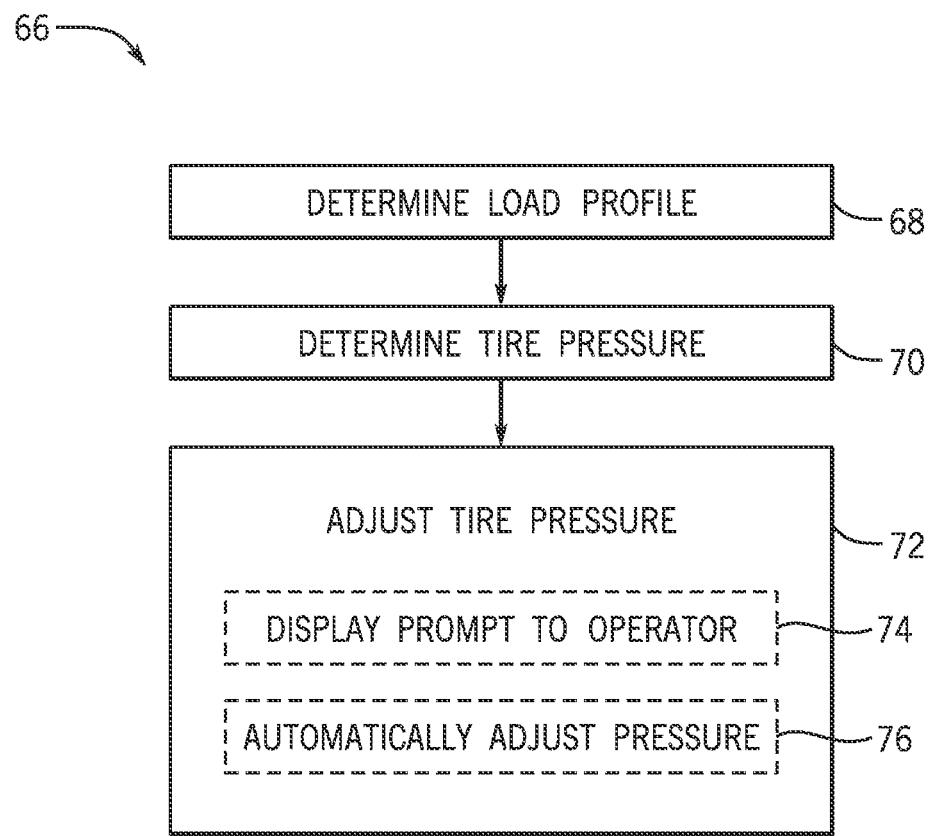
FIG. 6 is a flow diagram of a process for adjusting tire pressure based on load, in accordance with an embodiment.

Accordingly, it would be beneficial to enable the tire management system 44 to manage tire pressure even during operation of the off-road work vehicle 10. As used herein "during operation" is intended to describe when the off-road work vehicle 10 is performing a task, including while the tires are in motion (e.g., rotating). One embodiment of a process 66 that may be used to manage tire pressure during operation of the off-road work vehicle 10 and/or between tasks is shown in FIG. 6. Generally, the process 66 includes determining/acquiring the load profile (process block 68), determining tire pressure (process block 70), and adjusting tire pressure (process block 72). In some embodiments, the process 66 may be implemented by instructions stored in the memory 58 and executed by the processor 56.

In some embodiments, the control unit 52 may determine/acquire the load profile on the off-road work vehicle via the load sensors 40 (process block 68). More specifically, the processor 56 may determine the load profile on each tire based on a load measurement received from a corresponding load sensor 40. For example, the processor 56 may determine the load on the first front tire 16A via load measurements from the first load sensor 40A, the load on the second front tire 16B via load measurements from the second load sensor 40B, the load on the first rear tire 18A via load measurements from the third load sensor 40C, and the load on the second rear tire 18B via load measurements from the fourth load sensor 40D.

In some embodiments, the load profile determination may be initiated by an operator, for example, by pushing a button on the operator panel 54. In other embodiments, to facilitate managing tire pressure during operation, the control unit 52 may periodically poll the load sensors 40, for example, every five minutes. In other words, the load profile may be periodically determined during operation of the off-road work vehicle 10. Additionally or alternatively, the load sensors 40 may transmit a load measurement each time the load changes more than a threshold amount. In further embodiments, the load measurements may be continuously communicated from the load sensors 40 to the control unit 52. In other words, the load profile may be determined each time the load profile changes during operation of the off-road work vehicle 10.

Depending on the specific implementation, the sensitivity of the tire management system 44 may be adjusted. Generally, a larger number of load profile determinations by the control unit 52 may result in more tire pressure adjustments. Conversely, a smaller number of load profile determinations by the control unit 52 may result in fewer tire pressure adjustments. As such, the duration between polling and/or the pressure change threshold may be adjusted to increase or decrease the number of load measurements transmitted to the control unit 52. For example, when it is desirable for tire pressure to closely follow the desired tire pressure line 32, the duration between polling and/or the pressure change threshold may be reduced. On the other hand, when it is acceptable for tire pressure to deviate slightly from the desired tire pressure line 32, the duration between polling and/or the pressure change threshold may be increased.

The control unit 52 also determines the tire pressure of the tires via the pressure sensors 50 (process block 70). More specifically, the processor 56 determines tire pressure for each tire based on a pressure measurement received from a corresponding pressure sensor 50. For example, the processor 56 may determine the tire pressure of the first front tire 16A via pressure measurements from the first pressure sensor 50A, the tire pressure of the second front tire 16B via pressure measurements from the second pressure sensor 50B, the tire pressure of the first rear tire 18A via pressure measurements from the third pressure sensor 50C, and tire pressure of the second rear tire 18B via pressure measurements from the fourth pressure sensor 50D.

In some embodiments, the tire pressure determination may also be initiated by an operator, for example, via the same button that initiates the load profile determination. In other embodiments, to facilitate managing tire pressure during operation, the control unit 52 may periodically poll the pressure sensors 50, for example, every five minutes. In fact, in some embodiments, the pressure sensors 50 may be polled along with the load sensors 40. As such, the tire pressures may be periodically determined during operation of the off-road work vehicle 10. Additionally or alternatively, the control unit 52 may poll the pressure sensors 50 each time a load measurement is received from the load sensors 40. In other words, the tire pressures may be determined each time the load profile changes during operation of the off-road work vehicle 10. In further embodiments, the pressure measurements may be continuously communicated from the pressure sensors 50 to the control unit 52.

Based on the load and pressure measurements, the control unit 52 may then adjust the tire pressure (process block 72). As described above, the control unit 52 may utilize the desired tire pressure versus load relationship shown in the graph 30, which may be stored in memory 58. Accordingly, the processor 56 may retrieve the relationship (e.g., curve 32) from memory 58 and input the determined tire pressure and the determined load. More specifically, the processor 56 may determine whether a tire pressure adjustment is desirable based on how far the determined tire pressure is away from the desired tire pressure line 32 at the determined load.

In some embodiments, when the determined tire pressure differs from the desired tire pressure by more than a threshold amount, a tire pressure adjustment may be desirable. More specifically, the threshold may be set to take into account measurement errors by the pressure sensors 50 and/or the load sensors 40. Additionally, the threshold may be adjusted to control the sensitivity of the tire management system 44. For example, the threshold may be set lower so that the tires may be maintained closer to the desired tire pressure, which may cause the tire pressure to be adjusted more frequently. On the other hand, the threshold may be set higher so that the tire pressure may be less frequently adjusted to conserve resources.

When a tire pressure adjustment is desirable, the control system 52 outputs a tire pressure adjustment instruction. As described above, in some embodiments, the tire pressure adjustment instruction may optionally be transmitted to the operator panel 54, which in turn displays a prompt to the operator (process block 74). More specifically, the prompt may inform the operator of a desirable tire pressure adjustment to one or more tires based on the determined load. As described above, in some embodiments, the operator may manually make the desired tire pressure adjustment at each tire or from the cabin 26, for example, by depressing an increase tire pressure button 62 or a decrease tire pressure button 64.

In other embodiments, the control unit 52 may automatically adjust tire pressure by transmitting tire pressure adjustment instructions to the valves 48 (process block 76). More specifically, the tire pressure adjustment instruction may instruct a valve 48 to increase tire pressure in a corresponding tire by supplying air from the compressed air source 46 or to decrease tire pressure by releasing air from the tire. Additionally, separate tire pressure adjustment instructions may be sent to each valve 48, such that the air/fluid pressure in each tire is individually and independently managed based on the load placed on that tire.

Accordingly, the technical effects include enabling a vehicle, such as an off-road work vehicle, to adapt to varying load profiles. More specifically, the tire pressure of each tire may be adjusted to a desired tire pressure during operation of the vehicle. In some embodiments, a tire management system may determine the load placed on each tire via load sensors, and the tire pressure of each tire via pressure sensors. For the determined load, the tire management system may then determine how much the determined tire pressure differs from a desired tire pressure. Based on the comparison, valves in the tire management system may automatically or manually increase tire pressure by supplying air from a compressed air source or decrease tire pressure by releasing air from the tire. As such, the tire pressure of each tire may be individually managed such that the tire pressure is at or near the desired tire pressure, which enhances fuel efficiency, traction, and/or footprint of the vehicle.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A tire management system for an off-road work vehicle, comprising:
   a first load sensor coupled to a first axle of the off-road work vehicle, wherein the first load sensor comprises a first strain sensor configured to:
      determine a first deformation of the first axle; and
      determine a first load placed on a first tire of the off-road work vehicle coupled to the first axle based at least in part on the first deformation of the first axle;
   a first pressure sensor configured to determine a first fluid pressure within the first tire;
   a control unit communicatively coupled to the first load sensor and to the first pressure sensor, wherein the control unit is configured to generate a first fluid pressure adjustment instruction based at least in part on the first load determined by the first load sensor and the first fluid pressure determined by the first pressure sensor; and
   a first valve fluidly coupled to the first tire and communicatively coupled to the control unit, wherein the first valve is configured to adjust the first fluid pressure within the first tire based at least in part on the first fluid pressure adjustment instruction.

2. The tire management system of claim 1, comprising:
   a second load sensor coupled to a second axle of the off-road work vehicle, wherein the second load sensor comprises a second strain sensor configured to:
      determine a second deformation of the second axle; and
      determine a second load placed on a second tire of the off-road work vehicle coupled to the second axle based at least in part on the second deformation of the second axle;
   a second pressure sensor configured to determine a second fluid pressure within the second tire; and
   a second valve fluidly coupled to the second tire and communicatively coupled to the control unit, wherein the second valve is configured to adjust the second fluid pressure within the second tire based at least in part on a second fluid pressure adjustment instruction,
   wherein the control unit is configured to generate the second fluid pressure adjustment instruction based at least in part on the second load determined by the second load sensor and the second fluid pressure determined by the second pressure sensor.

3. The tire management system of claim 1, comprising a compressed air source, wherein the first valve is configured to increase the first fluid pressure within the first tire by connecting the first tire to the compressed air source such that the compressed air source flows air into the first tire.

4. The tire management system of claim 1, wherein the first valve is configured to reduce the first fluid pressure within the first tire by releasing air from the first tire.

5. The tire management system of claim 1, wherein the control unit is configured to:
   determine a target fluid pressure of the first tire based at least in part on the first load and a linear target fluid pressure versus load relationship;
   determine a pressure deviation threshold; and
   generate the first fluid pressure adjustment instruction when the first fluid pressure varies from the target fluid pressure by more than the pressure deviation threshold.

6. The tire management system of claim 5, wherein the control unit is configured to:
   increase the pressure deviation threshold to facilitate conserving resources used by the tire management system to adjust the first fluid pressure within the first tire; and
   decrease the pressure deviation threshold to facilitate improving performance of the off-road vehicle.

7. The tire management system of claim 1, comprising an operator panel configured to:
   receive the first fluid pressure adjustment instruction from the control unit; and
   display a visual representation to inform an operator whether to increase or decrease the first fluid pressure within the first tire, wherein the visual representation is based at least in part on the first fluid pressure adjustment instruction.

8. The tire management system of claim 1, wherein:
the control unit is configured to communicate the first fluid pressure adjustment instruction to the first valve; and
the first valve is configured to automatically adjust the first fluid pressure within the first tire in response to the first fluid pressure adjustment instruction.

9. The tire management system of claim 1, comprising an operator panel configured to:
receive an operator input comprising an increase pressure control or a decrease pressure control; and
communicate the operator input to the control unit, wherein the control unit is configured to:
generate the first fluid pressure adjustment instruction based at least in part on the operator input; and
communicate the first fluid pressure adjust instruction to the first valve to enable the first valve to adjust the first fluid pressure within the first tire in response to the operator input received via the operator panel.

10. The tire management system of claim 1, wherein the first load sensor is configured to:
determine a load change threshold from memory; and
communicate the first load to the control unit when the first load changes by more than the load change threshold.

11. The tire management system of claim 10, wherein the control unit is configured to retrieve the first fluid pressure from the first pressure sensor in response to receiving the first load from the first load sensor.

12. The tire management system of claim 1, wherein the first load sensor and the first pressure sensor are configured to periodically communicate the first load and the first fluid pressure, respectively, to the control unit.

13. A tangible, non-transitory, computer-readable medium storing instructions executable by one or more processors of a tire management system in an off-road work vehicle, wherein the instructions comprise instructions to:
determine, using the one or more processors, target resource consumption of the off-road work vehicle and target performance of the off-road vehicle;
adjust, using the one or more processors, a pressure deviation threshold based at least in part on the target resource consumption and the target performance;
determine, using the one or more processors, a load profile on a tire of the off-road work vehicle based at least in part on a load indication received from a load sensor;
determine, using the one or more processors, a target fluid pressure within the tire based on the load profile;
determine, using the one or more processors, a measured fluid pressure within the tire based at least in part on a pressure measurement received from a pressure sensor; and
instruct, using the one or more processors, a valve fluidly coupled to the tire to adjust the fluid pressure within the tire during operation of the off-road work vehicle when the measured fluid pressure varies from the target fluid pressure by more than the pressure deviation threshold.

14. The computer readable medium of claim 13, comprising instructions to:
instruct, using the one or more processors, the valve to remain closed when the measured fluid pressure is higher than the target fluid pressure by less than the pressure deviation threshold;
instruct, using the one or more processors, the valve to remain closed when the measured fluid pressure is lower than the target fluid pressure by less than the pressure deviation threshold; and
instruct, using the one or more processors, the value to remain closed when the measured fluid pressure is equal to the target fluid pressure.

15. The computer readable medium of claim 13, wherein the instructions to instruct the valve to adjust the fluid pressure within the tire comprise instructions to:
instruct the valve to supply air to the tire when the measured fluid pressure is higher than the target fluid pressure by more than the pressure deviation threshold; and
instruct the valve to release air from the tire when the measured fluid pressure is lower than the target fluid pressure by more than the pressure deviation threshold.

16. The computer readable medium of claim 13, wherein:
the load sensor comprises a strain sensor configured to determine axle deformation of an axle of the off-road work vehicle; and
the axle deformation is configured to provide an indication of the load profile.

17. A tire management system for a vehicle comprising:
a strain sensor coupled to an axle of the vehicle, wherein the strain sensor is configured to determine deformation of the axle;
a valve fluidly coupled to a tire of the vehicle; and
a control unit communicatively coupled to the valve and the strain sensor, wherein the control unit is configured to:
determine load on the tire based at least in part on the deformation of the axle;
determine a target fluid pressure based at least in part on the load on the tire;
adjust a pressure deviation threshold based at least in part on target resource consumption of the vehicle, target performance of the vehicle, or both;
instruct the valve to increase fluid pressure within the tire when a sensed fluid pressure is lower than the target fluid pressure by more than the pressure deviation threshold during operation of the vehicle; and
instruct the valve to decrease the fluid pressure within the tire to when the sensed fluid pressure is higher than the target fluid pressure by more than the pressure deviation threshold during operation of the vehicle.

18. The tire management system of claim 17, wherein the control unit is configured to:
determine a target shape of the tire and a target fuel economy of the vehicle; and
determine the target fluid pressure based at least in part on the target shape of the tire and the target fuel economy of the vehicle.

19. The tire management system of claim 17, wherein the control unit is configured to:
increase the pressure deviation threshold when expected resource consumption of the vehicle is greater than the target resource consumption; and
decrease the pressure deviation threshold when expected performance of the vehicle is less than the target performance.

20. The tire management system of claim 17, wherein the vehicle comprises an off-road tractor or an off-road truck.

* * * * *